(12) United States Patent
Okorocha et al.

(10) Patent No.: US 6,196,755 B1
(45) Date of Patent: Mar. 6, 2001

(54) LOCKING DEVICE FOR PROJECTION TELEVISION LENS ASSEMBLY

(75) Inventors: Livyn Obiajuru Okorocha; Wilton Ray Purvis, both of Cincinnati, OH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/305,938

(22) Filed: May 6, 1999

(51) Int. Cl.⁷ ........................................................ F16B 7/22
(52) U.S. Cl. .......................... 403/313; 403/335; 403/329; 359/819
(58) Field of Search ..................... 403/309, 310, 403/311, 313, 335, 344, 329, 326, 51; 359/819, 821, 827, 808; 24/575, 588, 459, 615, 616; 285/419, 903; 248/74.4; 174/92

(56) References Cited

U.S. PATENT DOCUMENTS

| | | |
|---|---|---|
| 1,250,820 | 12/1917 | Dyer et al. . |
| 3,083,773 | 4/1963 | Nagel et al. ............................ 166/176 |
| 3,757,031 * | 9/1973 | Izraeli ................................. 24/459 X |
| 4,371,594 | 2/1983 | Ohara et al. .............................. 429/97 |
| 4,405,161 * | 9/1983 | Young et al. ........................ 24/459 X |
| 4,510,215 | 4/1985 | Adam ...................................... 429/99 |
| 4,526,440 * | 7/1985 | Lundberg et al. ..................... 359/827 |
| 4,612,680 * | 9/1986 | Daiguji ............................... 24/459 X |
| 4,688,337 * | 8/1987 | Dillner et al. ........................... 24/616 |
| 4,776,681 | 10/1988 | Moskovich ............................ 350/432 |
| 4,806,440 | 2/1989 | Hahs, Jr. et al. ...................... 429/100 |
| 5,056,197 | 10/1991 | Cohen ...................................... 24/304 |
| 5,202,706 | 4/1993 | Hasegawa ............................. 359/819 |
| 5,214,533 * | 5/1993 | Moracchini ....................... 359/819 X |
| 5,249,082 | 9/1993 | Newman ............................... 359/813 |
| 5,276,555 | 1/1994 | Sansbury ............................... 359/826 |
| 5,577,836 | 11/1996 | Vent et al. .............................. 362/61 |
| 5,577,855 | 11/1996 | Leyden et al. ........................ 403/291 |
| 5,653,550 | 8/1997 | Mutz et al. ............................ 403/329 |
| 5,678,953 | 10/1997 | Usui et al. ............................ 403/329 |

* cited by examiner

*Primary Examiner*—Harry C. Kim
(74) *Attorney, Agent, or Firm*—Silvy Murphy

(57) ABSTRACT

The invention provides a locking device for locking two matching lens cell halves of a lens cell. In particular, the invention resides in clips which are located at the joint where the two cell halves mate. The clips, which are molded as part of each cell half, are each comprised of a male member which is inserted into a female member. The male member includes a flexible tab which is deflected when inserted into the female member. After insertion, it is maintained in a deformed state, that is the tab is maintained by the female member so that it is bent from its original position. As a result, a bending moment is induced and maintained in the tab and that moment pushes the tab against an outer wall of the female member. Consequently, forces are established which lock the male member in place. Additionally, the wall of the female member exerts a force on the tab and that force, which is inwardly directed, serves to lock together the two halves and ensures retention of the lens units within the lens cell.

28 Claims, 9 Drawing Sheets

LOCKING DEVICE FOR PROJECTION TELEVISION LENS ASSEMBLY

FIELD OF THE INVENTION

The present invention relates to projection television lens assemblies and, in particular, to a locking device employed in such assemblies.

BACKGROUND OF THE INVENTION

Projection televisions are well known. In general, a projection television set or projector includes three cathode ray tubes (CRTs), corresponding to the primary colors, red, blue, and green. Associated with each of the CRTs is a projection lens assembly, which is comprised of a plurality of optical lens units. Overall, a CRT has an attached faceplate, and the function of the lens assembly is to magnify the image appearing on the faceplate of the CRT, and thereby project it onto a viewing screen, which is much larger than the faceplate of the CRT. For a typical layout of the optical lens units in a projection television lens assembly see U.S. Pat. No. 4,776,681.

An illustrative, prior art lens cell 10 used in a projection television lens assembly is shown in FIG. 1. Basically, it comprises a plastic tubular member, generally referred to as a lens cell 10. As shown therein, the lens cell 10 itself is further comprised of two corresponding cell halves 12 and 14. The lens cell 10 has grooves which hold the optics or the optical lens units. After the optics are mounted within one of the corresponding cell halves, the other of the cell halves is used to lock in the optics. In the past, cantilever snaps, referred to by reference numeral 13, have been employed to fasten the two cell halves 12 and 14 together, thus ensuring the retention of the optical lens units within the lens cell 10. The most commonly used cantilever snap design has an undercut molded onto the "male" flexing member for engagement with the "female" component, shown in FIGS. 1 and 1A. The cell halves 12 and 14 of the lens cell 10 are assembled together by the use of an assembly fixture that exerts an external force on the cell halves 12 and 14 to engage the cantilever snaps 13. Upon engagement of the cantilever snaps 13, the external force is released and the optics within the lens cell 10 react by pushing back on each of the cell halves 12 and 14. The problem with such a cantilever snap design is that once the optics are mounted within the lens cell 10, the cantilever snaps 13 are usually constantly under load due to the force $F_e$ exerted by the optics. As such, the cantilever snap design fails to provide a retention force that opposes the internal force $F_e$ exerted by the optics, which pushes outwardly against each of the lens cell halves 12 and 14, tending to separate the cell halves 12 and 14. Thus, the constant load causes the cantilever snaps 13 to disengage, resulting in a separation of the cell halves 12 and 14 of the lens cell 10.

An object of the invention is to provide a locking device that ensures retention of the optical lens units within the lens cell. Another object of the invention is to provide a locking device that provides a retention force that opposes the force exerted outward against each of the lens cell halves by the optics within the lens cell. Yet, a further object of the invention is to provide a locking device that can be easily unlocked or disengaged.

SUMMARY OF THE INVENTION

Accordingly, the present invention is directed to a projection television lens assembly that substantially obviates one or more of the limitations and disadvantages of the related art. The present invention provides a solution to the problems described above relating to lens cell assemblies in a projection television. Specifically, the invention provides a locking device for locking two matching lens cell halves of a lens cell.

In accordance with the broadest aspect of the present invention, the invention resides in clips which are located at the joint where the two cell halves mate. The clips, which are molded as part of each cell half, are each comprised of a male member which is inserted into a female member. The male member includes a flexible tab which is deflected when inserted into the female member. After insertion, it is maintained in a deformed state, that is the tab is maintained by the female member so that it is bent from its original position. As a result, a bending moment is induced and maintained in the tab and that moment pushes the tab against an outer wall of the female member. Consquently, forces are established which lock the male member in place. Additionally, the wall of the female member exerts a force on the tab and that force, which is inwardly directed, serves to lock together the two halves and ensures retention of the lens units within the lens cell.

To ensure that the forces described above are properly directed, the surface at the end of the tab and the surface of the female member against which it abuts are appropriately selected. When properly selected, there will be sufficient inwardly directed forces that the cell halves are held together. Specifically, when the angle of the surface of the tab with respect to a radial line through that surface equals β and β is appropriately selected, for example about 15°.

The basic construction of the male member includes a wall which extends from the cell half and an inverted flexible portion which is connected to it. The flexible portion is the part which deforms when the male member is inserted into the female member. The angle between the flexible portion of the male member and the wall that extends from the cell half is equal to θ. In particular, θ is appropriately selected, such that, the retention force, $F_r$, will be related to the deforming force, $F_i$, by the expression $F_r = F_i \cos(90 - \theta)$. In a preferred embodiment, θ is chosen to be approximately 15°. The female member includes an integral tab having an interior surface. The male member is received between the tab and the exterior of cell half to which the tab is connected.

DESCRIPTION OF THE PREFERRED EMBODIMENTS

The invention disclosed herein is generally embodied in a projection television lens assembly incorporating a locking device that locks together two corresponding lens cell halves that comprise a lens cell.

Figure 2:
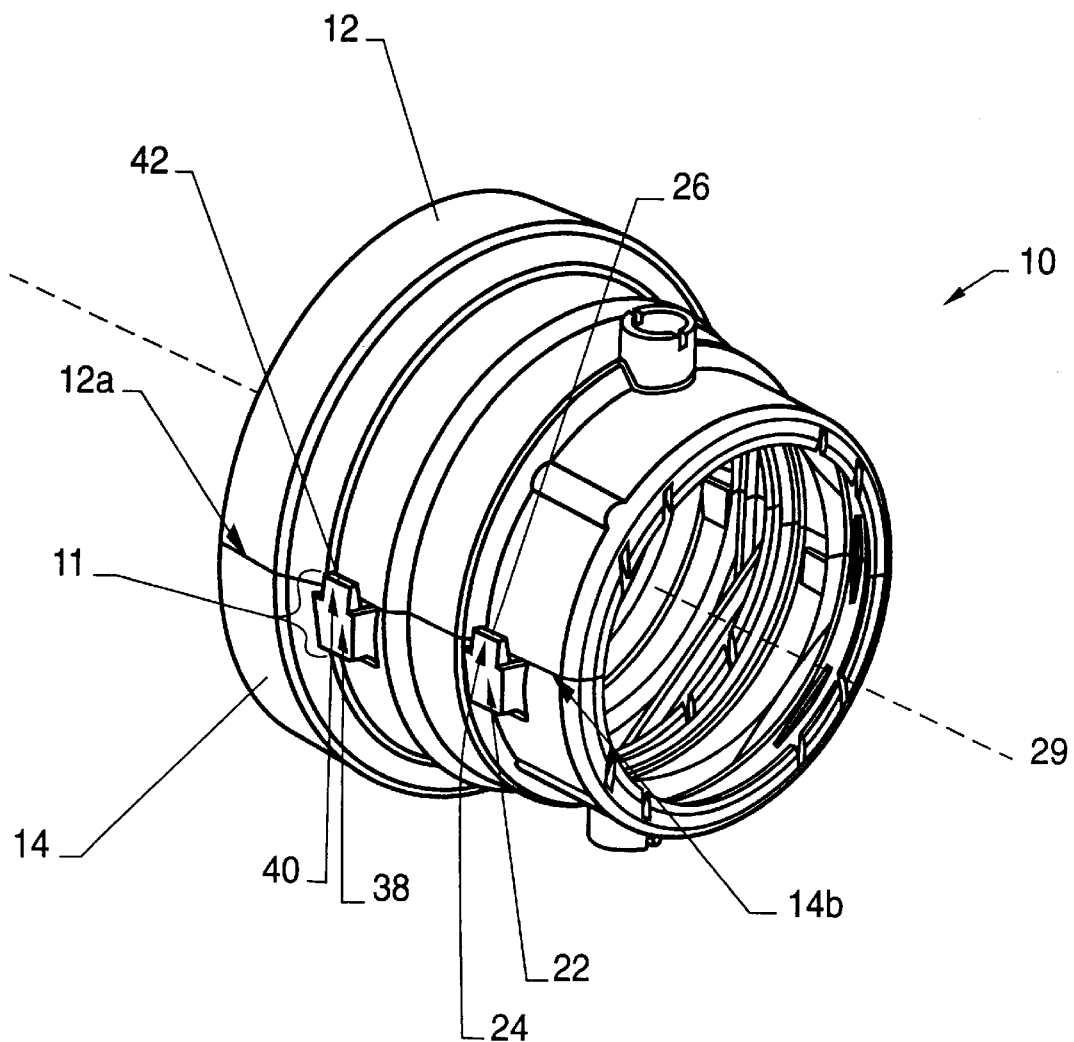
FIG. 2 is a perspective view of a lens cell illustrating an embodiment of the locking device of the present invention.
Figure 3:
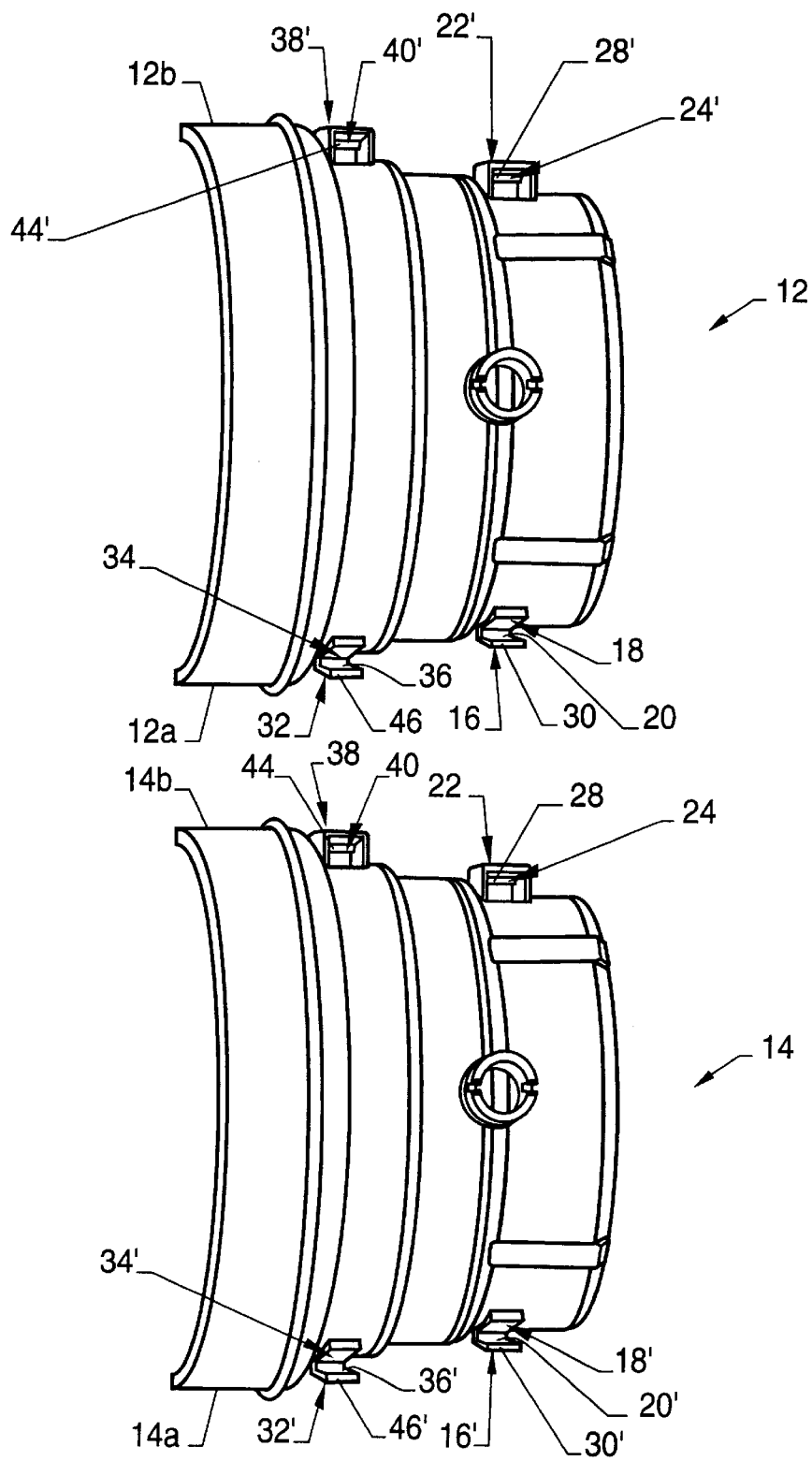
FIG. 3 is a perspective view of two identically constructed lens cell halves that make up the lens cell shown in FIG. 1.

A lens cell designated generally by reference numeral 10 incorporating a locking device 11 of the present invention is shown in FIG. 2. FIG. 2 is a perspective view of the lens cell 10, which is comprised of a first lens cell half 12 and a second lens cell half 14. As shown in FIG. 3, the first lens cell half 12 has a first edge 12a and a second edge 12b, and the second lens cell half 14 also has a first edge 14a and a second edge 14b. Both the first lens cell half 12 and the second lens cell half 14 are identical in construction. A plurality of optical lens units (not shown in any of the drawings) are held within the lens cell 10 by a plurality of locking devices 11, and in a preferred embodiment, there are four locking devices 11, each one being identical in construction. When the two lens cell halves 12 and 14 are joined together to form the lens cell 10, the first locking device 11 is located approximately 180° apart from the second locking device 11, whereas, the third locking device 11 is spaced apart from the first locking device (as shown in FIG. 2) and approximately 180° apart from the fourth locking device 11. The prime symbol next to numerals indicates the same or similar elements that are associated with the second and fourth locking devices 11 of the lens cell 10. Since each of the locking devices 11 is identical in construction the description will track the first locking device 11.

Figure 4:
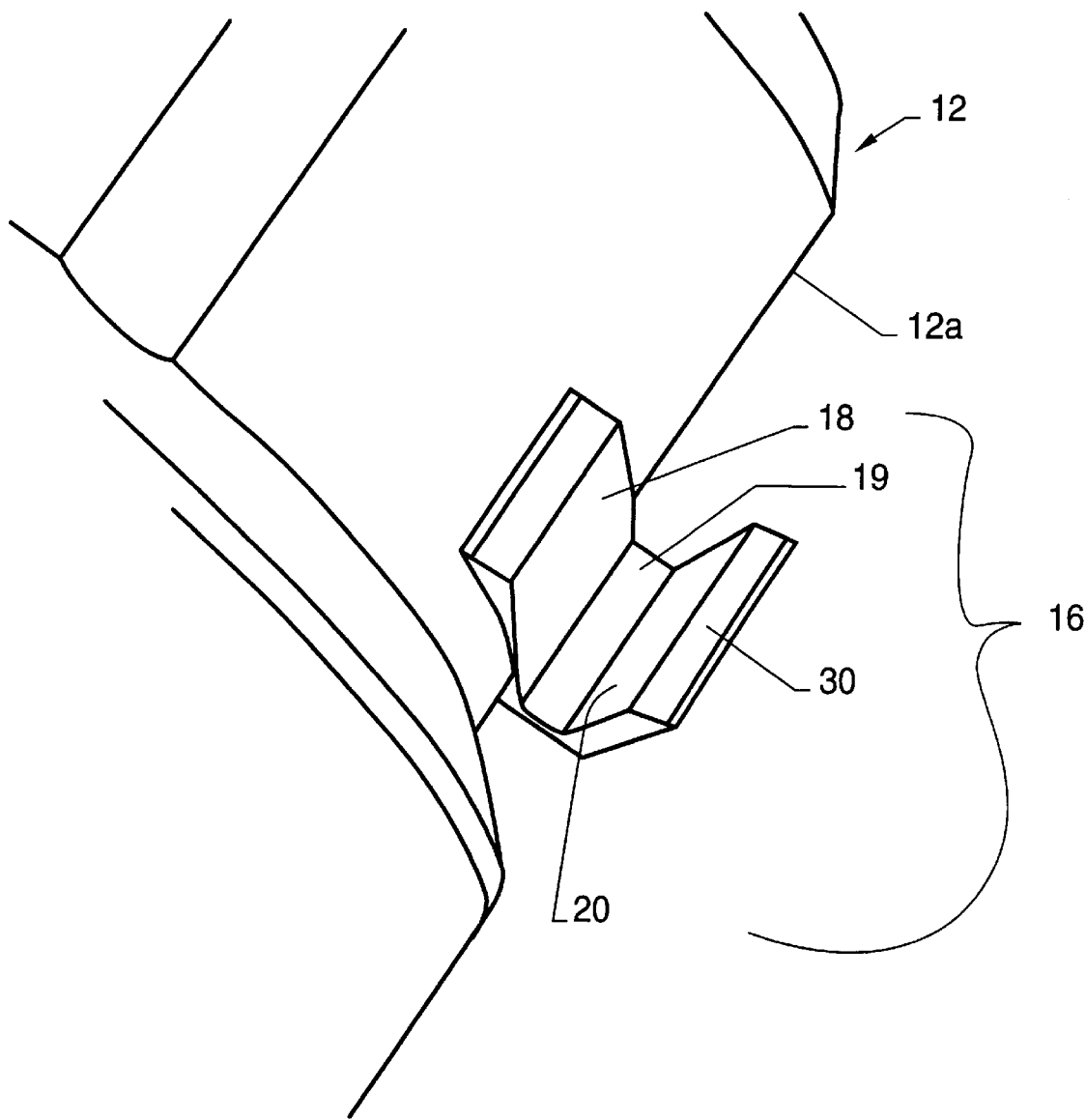
FIG. 4 is a partial perspective view of a component part of the locking device of the present invention.

The first locking device 11 includes a first hook member 16 projecting from the first edge 12a of the first lens cell half 12. As shown in FIG. 4, the first hook member 16 has a rigid portion 18 that is integral with and tangent to the first lens cell half 12. Further, the rigid portion 18 is integrally connected to an inverted flexible portion 20, which flexible portion 20 is oriented at an angle θ with respect to a plane parallel to the rigid portion 18 of the first hook member 16. The first locking device 11 further comprises a first loop member 22 (shown in FIG. 5) for receiving the first hook member 16. The first loop member 22 is integral with and projects from the second lens cell half 14, where the second edge 14b of the second lens cell half 14 is in the plane which defines the bottom of the first loop member 22. The first loop member 22 has an integral first tab member 24 (shown in FIGS. 5, 6 and 7) that is integral with and extends from an interior surface 23 of the first loop member 22, which interior surface 23 is distal to the second lens cell half 14. The first tab member 24 is orthogonal with respect to a central axis 29 (shown in FIG. 2) passing through the lens cell 10. Further, the first tab member 24 has an exterior end 26 (shown in FIGS. 2, 6, 7 and 9) protruding out of the first loop member 22 and an opposite interior end surface 28 (shown in FIGS. 3, 5, 6, and 7) residing within the first loop member 22. The exterior end 26 of the first tab member 24 is positioned at an insertion end 27 (shown in FIG. 6 and 9) of the first loop member 22. Further, an interior surface 23 of the tab member 24 is inclined at an angle θ with respect to a plane extending centrally through the loop member 22.

A second locking device 11 comprising of a pair of hook and loop members 16'–22', is also provided, as shown in FIG. 3. Similarly, the lens cell 10 is provided with a third and fourth locking device, each comprising of pair of hook and loop members 32–38 and 32'–38', as shown in FIG. 3. The construction of each of these pair members is the same as described for the pair of hook and loop members 16–22, except that the hook members 16' and 32' project from the first edge 14a of the second lens cell half 14 and the loop members 22' and 38' project from the wall of the first lens cell half 12. Also, the second edge 12b of the first lens cell half 12 (shown in FIG. 3) is in the plane which defines the bottom of each of the second and fourth loop members, 22' and 38', respectively.

Figure 5:
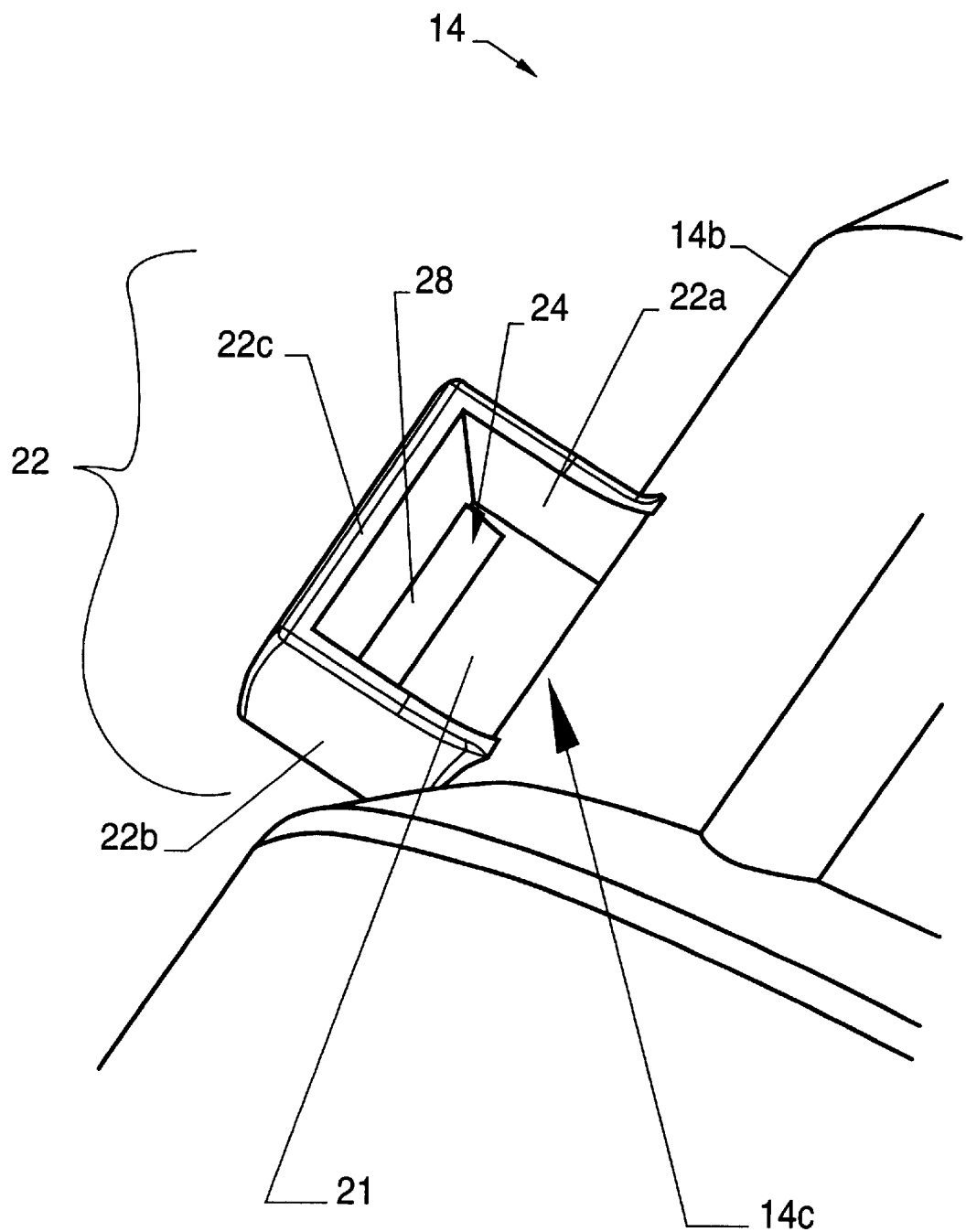
FIG. 5 is a partial perspective view of a component part of the locking device of the present invention.
Figure 6:
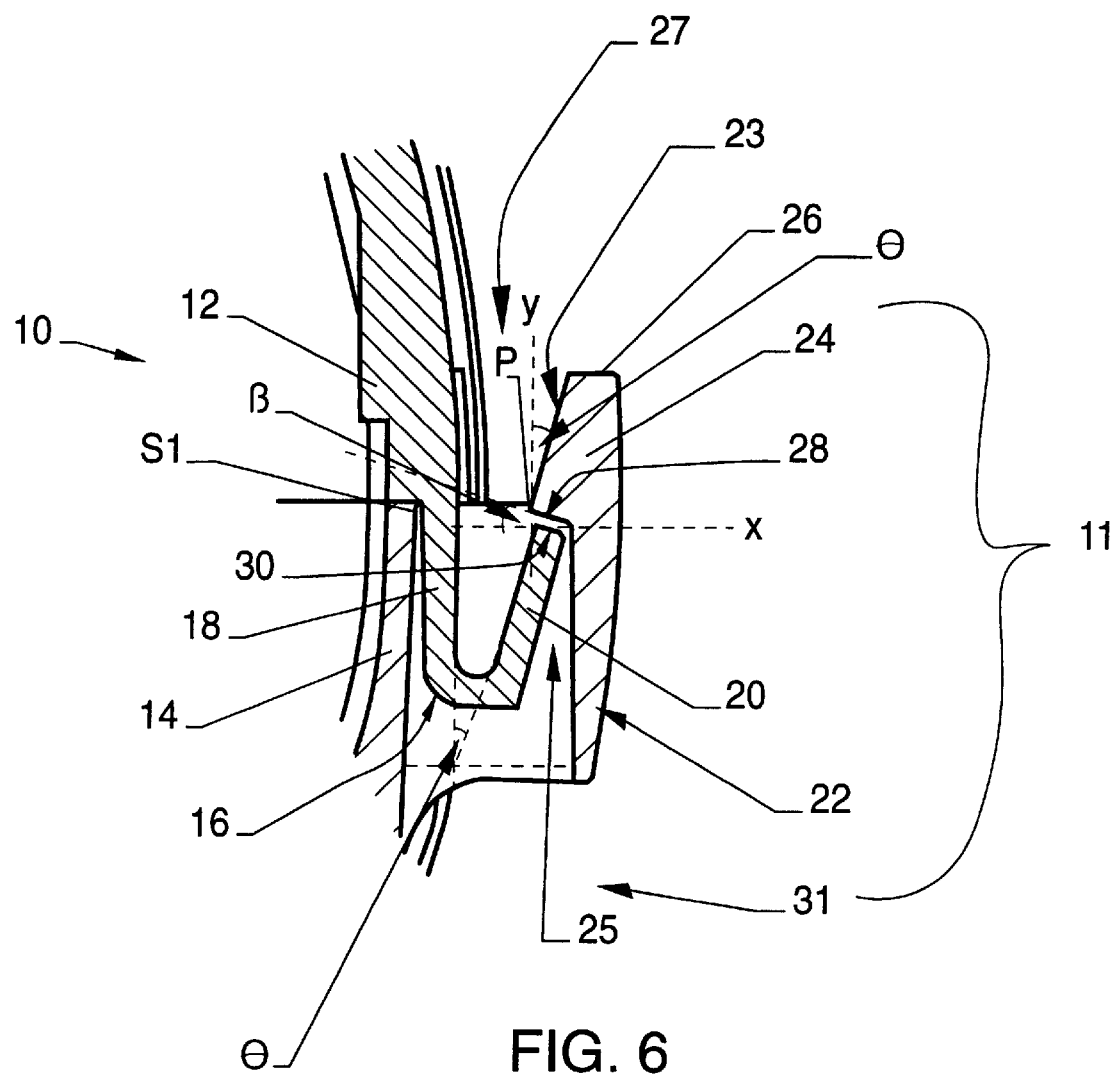
FIG. 6 is a partial side-sectional view illustrating an embodiment of the present invention.
Figure 9:
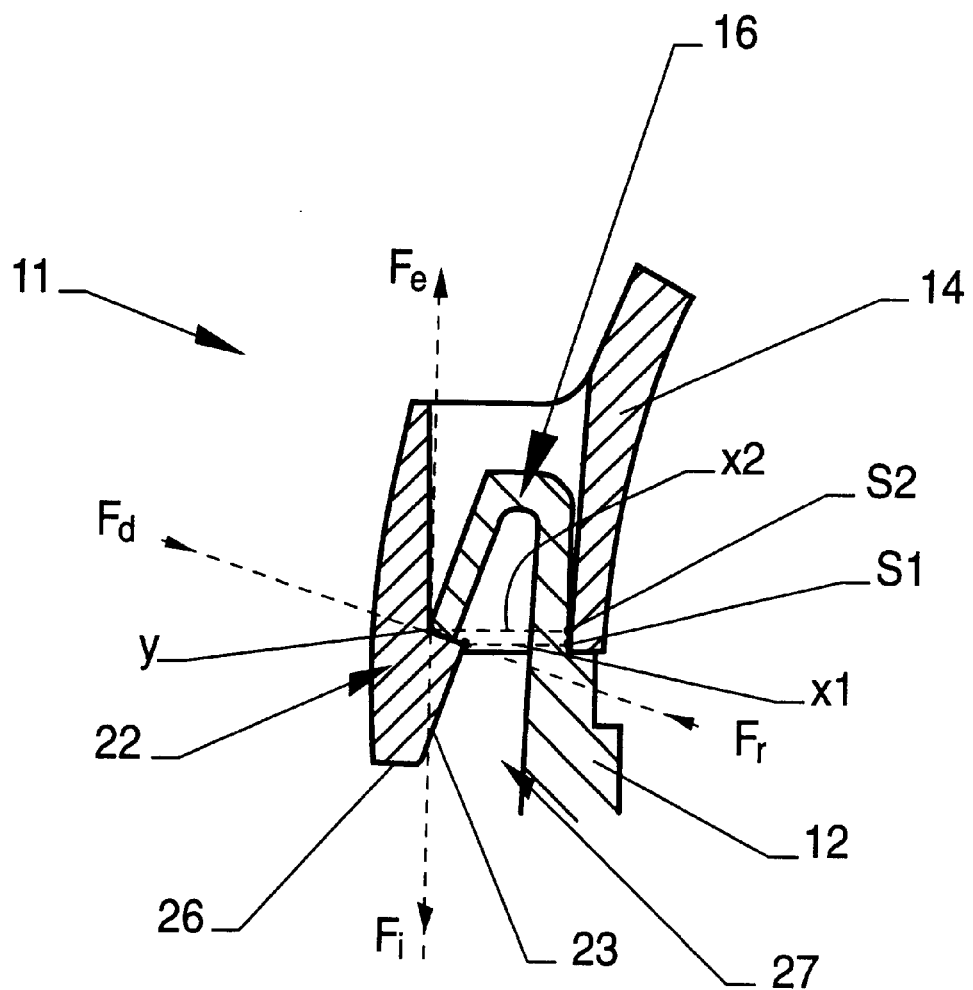
FIG. 9 is a partial side-sectional view showing the engagement of the component parts of the locking device of the present invention.

In a further embodiment, the invention provides a plastic locking clip 11 comprising an injection molded unitary male member 16 (shown in FIG. 4) and an injection molded unitary female member 22 (shown in FIG. 5). The female member 22 comprises a first wall 14c, two spaced apart, generally parallel walls 22a and 22b extending outwardly from the first wall 14c, where the proximal ends of the parallel walls 22a and 22b being integrally connected to the first wall 14c, a fourth wall 22c extending from and integrally connecting the distal ends of the parallel walls 22a and 22b thereby defining a space 21 between the fourth wall 22c and the first wall 14c and an insertion end 27 into which a male member may be inserted. Further, as shown in FIGS. 6 and 9, an interior surface 23 of the fourth wall 22c, at the insertion end 27, is inwardly inclined at an angle θ with respect to a plane extending centrally through the space 21 and equally spaced from the first and fourth walls, 14c and 22c, respectively. Moreover, the interior surface 23 of the female member 22 terminates at a point P (shown in FIGS. 6 and 9) where the interior surface 23 is intersected by a second surface 28 that extends outwardly from and is integral with the fourth wall 22c, the second surface 28 terminates at the interior of the fourth wall 22c. The point P is spaced apart from a point S1 on the interior of the first wall 14c by a distance X1, each of the points P and S1 being in a plane that is substantially at a right angle to each of the first and fourth walls, 14c and 22c. As shown in FIG. 4 the male member 16 comprises a first wall 18, a second wall 19 integral with and extending at substantially a right angle from the first wall 18, a third wall 20 integrally connected to the second wall and extending therefrom so as to define a space between the first wall 18 and the third wall 20. The interior and exterior surface of the third wall 20 is at an angle θ with respect to the interior surface of the first wall 18. Further, the third wall 18 terminates at a surface 30, which is inclined substantially at an angle β with respect to a plane which is at a right angle to the interior of the first wall 18. Also, the intersection of the inclined surface 30 and the exterior surface of the third wall 20 defines a point Y (shown in FIG. 9), with the point Y being spaced apart from a point S2 on the exterior of the first wall 18 by a distance X2. Each of the points Y and S2 is in the same plane that is at a right angle to each of the first and third walls, 18 and 20 respectively, of the male member 16, and where the distance X2 is greater than the distance X1. Further, the exterior of the first wall 18 has a step formed therein for engagement with a terminal end of the first wall 14c of the female member 22.

Figure 1A:
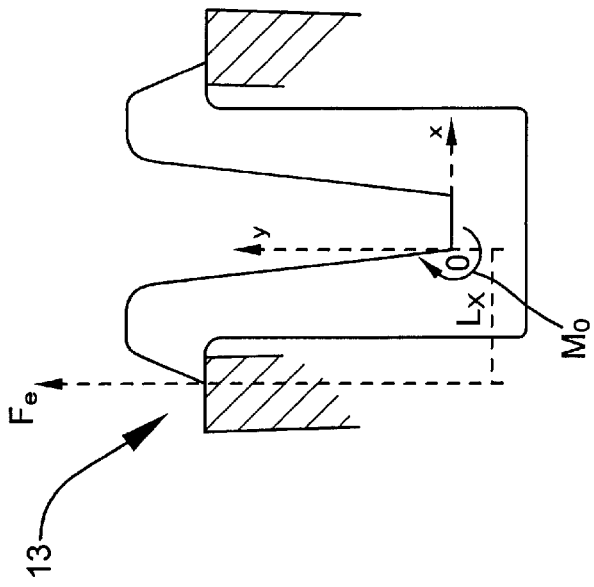
FIG. 1A is a fragmentary side-sectional view of the locking device shown in FIG. 1.
Figure 1:
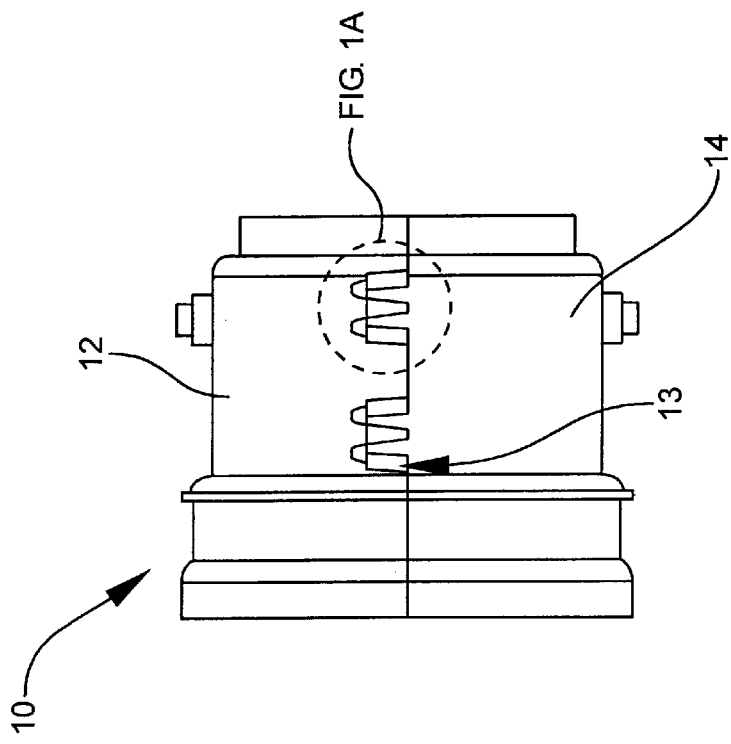
FIG. 1 is a side-sectional view of a lens cell illustrating a prior art locking device.
Figure 7:
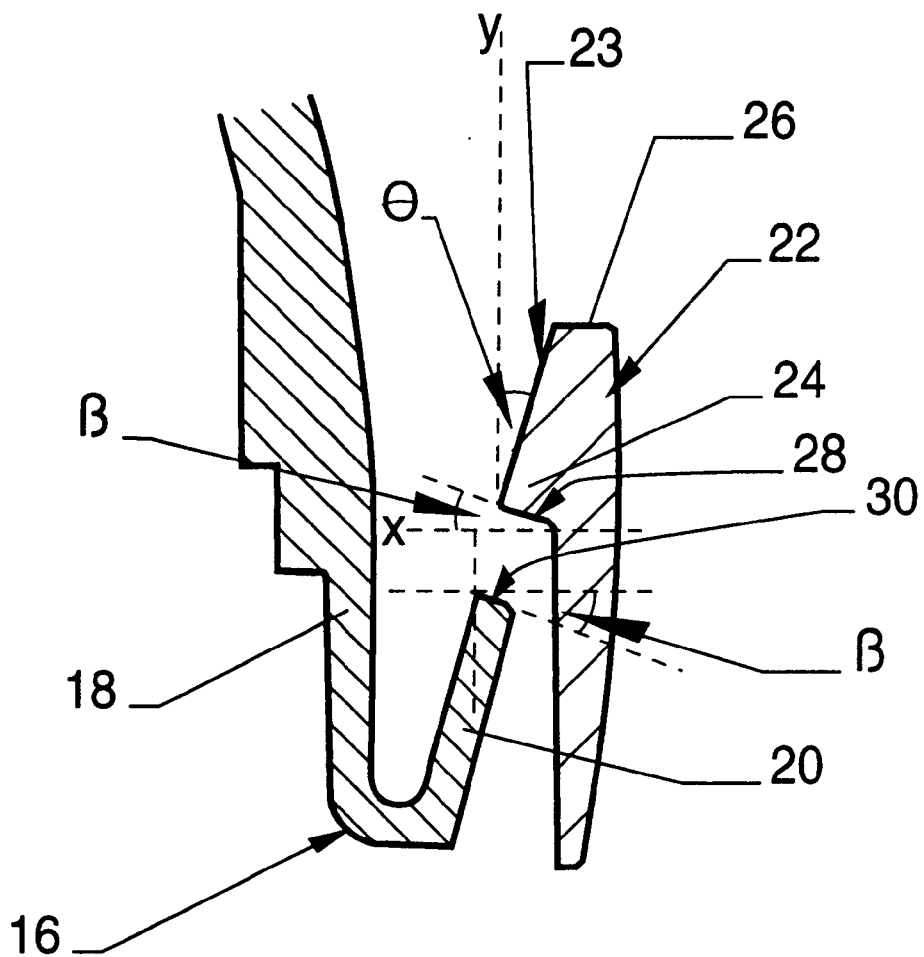
FIG. 7 is a partial side-sectional view of the embodiment in FIG. 5.

During assembly, the first hook member 16 is inserted into the insertion end 27 of the first loop member 22 and the second hook member 16' is inserted into the second loop member at the insertion end 27' of the second loop member 22'. Upon complete insertion of the first hook member 16 into the first loop member 22, the hook member 16 is sandwiched between the wall of the first cell half 14 and the interior surface 23 of the first loop member 22, and an engaging surface 30 of the inverted flexible portion 20 of the first hook member 16 firmly abuts the interior end surface 28 of the first tab member 24 as shown in FIGS. 6 and 7. Upon complete insertion of the second hook member 16' into the second loop member 22', the engaging surface 30' of the flexible portion 20' of the second hook member 16' firmly abuts the interior end surface 28' of the second tab member 24'. Furthermore, the third hook member 32 and the fourth hook member 32' are each inserted into the third loop member 38 and fourth loop member 38', respectively, further ensuring that the lens cell 10 is locked. The first lens cell half 12 and the second lens cell half 14, when locked together, are positioned such that the first edge 12a of the first lens cell half 12 abuts the second edge 14b of the second lens cell half 14 (shown in FIG. 1) and the second edge 12b of the first lens cell half 12 abuts the first edge 14a of the second lens cell half 14.

In a preferred embodiment, the first hook member 16 is positioned approximately 180° apart from the second loop member 22' along a first perimeter of the first lens cell half 12, as shown in FIG. 3, and the third hook member 32 is positioned approximately 180° apart from the fourth loop member 38' along a second perimeter of the first lens cell half 12. Similarly, the second hook member 16' is positioned approximately 180° apart from the first loop member 22 along a first perimeter of the second lens cell half 14, and the fourth hook member 32' is positioned approximately 180° apart from the third loop member 38 along a second perimeter of the second lens cell half 14. The first perimeter of the first lens cell half 12 and the first perimeter of the second lens cell half 14 form a first circumferential plane (not shown in any of the drawings) of the lens cell 10, and likewise the second perimeter of the first lens cell half 12 and the second perimeter of the second lens cell half 14 form a second circumferential plane (not shown in any of the drawings) of the lens cell 10. The first circumferential plane of the lens cell 10 is spaced a distance apart from the second circumferential plane of the lens cell 10. Moreover, the hook members 16, 16', 32 and 32' and the loop members 22, 22', 38 and 38' are each positioned such that when the first lens cell half 12 and the second lens cell half 14 are joined together the hook members 16 and 32 slide into the loop members 22 and 38, respectively. Similarly, the hook members 16' and 32' slide into the loop member 22' and 38' respectively.

Furthermore, as shown in FIG. 7, the engaging surface 30 of the inverted flexible portion 20, of the hook member 16, is inclined at an angle β with respect to a plane that is at a right angle to the rigid portion 18 of the hook member 16. Moreover, the interior end surface 28 of the tab member 24 is inclined at the same angle β with respect to the plane that is at a right angle to the interior surface 23 of the tab member 24. Thus, when the hook member 16 is inserted into the loop member 22, the engaging surface 30 firmly abuts the interior end surface 28. Similarly, the respective engaging surfaces 30', 46 and 46' of the hook member 16', 32 and 32' are each identically inclined at substantially the same angle β as the engaging surface 30, and the respective interior end surfaces 28', 44 and 44' of the loop members 22', 38 and 38', are each also identically inclined at substantially the same angel β as the engaging surface of the interior end surface 28. In a preferred embodiment, the angle θ is equal to the angle β, and in a preferred embodiment, both angles θ and β are each about 15°. Some of the factors considered in obtaining a preferred optimal angle θ of about 15° are an insertion force $F_i$ exerted against the hook member 16 during insertion into the loop member 22, the strength of the material that the locking device 11 is made up of and the low profile that is, a tight space within which to work and telescopically mount the lens cell 10 within a tubular focus mount (not shown). The smaller the angle θ, the more effective is the retention of the hook member 16 within the loop member 22.

Figure 8:
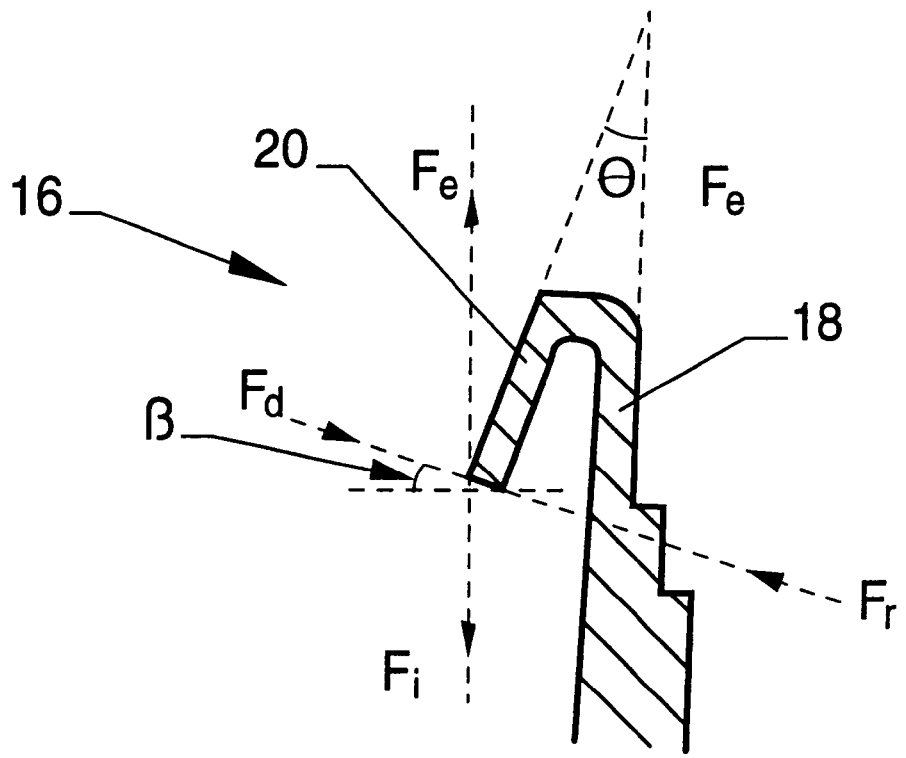
FIG. 8 is a partial side-sectional view of a component part of the locking device of the present invention.

Moreover, as partially shown in FIG. 8, when the first lens cell half 12 is joined to the second lens cell half 14, and when each of the hook members 16, 16', 32 and 32' is inserted into each of the loop members 22, 22', 38 and 38', respectively, an insertion force $F_i$ is exerted against each of the hook members 16, 16', 32 and 32', whereas, the optical lens units mounted within the lens cell 10 exert an exertion force $F_e$ that is equal but opposite in direction to the insertion force $F_i$, and which force $F_e$ pushes outwardly against the lens cell 10. Moreover, during insertion of the hook member 16 into the loop member 22, a sideway deflection force $F_d$ acts on the hook member 16 to deflect the hook member 16 as it goes over the interior surface 23 of the tab member 24. Moreover, a clockwise bending moment $M_o$ causes the flexible portion 20 of the hook member 16 to be wedged against the interior end surface 28 of the tab member 24 once point P has been passed. The bending moment $M_o$ creates a retention force $F_r$, which is equal in magnitude and opposite in direction to the deflection force $F_d$, and acts on the hook member 16 only when it is fully inserted into the loop member 22. The retention force $F_r$ retains the hook member 16 within the loop member 22. Furthermore, the deflection force $F_d$ is directly proportional to the size of the angle θ of the hook member 16, that is, the angle between the rigid portion 18 and the flexible portion 20. The retention force $F_r$ exerted on the hook member 16 to maintain engagement with each of the loop members 22, 22', 38 and 38' is not tangential or oblique to the central axis 29 lens cell 10 and is given by the formula $F_r = F_i \cos(90 - \theta)$, where $F_i$ is the insertion force, mentioned above. The hook members 16', 32 and 32' undergo similar forces as the hook member 16.

Once the first lens cell half 12 and the second lens cell half 14 of the lens cell 10 are locked together, the only way to disengage the lens cell 10 is to employ a disassembly tool, such as a flat head screwdriver. The tool is inserted into any one of the loop members 22, 22', 38 and 38'. In particular, the flat head of the screwdriver is inserted into the loop member 22 opposite from the insertion end 27. To disengage the two cell halves 12 and 14, the flat head should be inserted between the hook members and the loop members. For instance, referring to FIG. 6, in order to disengage the hook member 16 from loop member 22, the screwdriver should be inserted in the region 25 between the flexible portion 20 of the hook member 16 and the interior wall of the loop member 22, and a force in the direction of region 25 arrow should be applied against the hook member 16 to disengage the engaging surface 30 of the flexible portion 20 of the hook member 16 from the interior end surface 28 of the loop member 22, while simultaneously pulling apart the two cell halves 12 and 14. Accordingly, the flexibility of the design of the locking device 11 of the present invention permits reuse of the optical lens units contained within the lens cell 10. Also, during insertion, the flexible portion 20 of the hook member 16 is bent such that the angle θ is less than 15°. However, once the hook member 16 clears the interior surface 23 of the tab member 24, the hook member 16 springs back to about 15°.

In a preferred embodiment, the lens cell 10, including each of the locking devices 11 is entirely made of a plastic material. Although, in a preferred embodiment, the lens cell 10 has four locking devices 11, the lens cell 10 can alternatively have two locking devices 11, each being located approximately 180° apart from each other on the lens cell 10. Furthermore, although the inverted flexible portion 20, 36, 20' and 36' of each of the hook members 16, 32, 16' and 32' is inclined at an angle θ from the rigid portions 18, 34, 18' and 34', where angle θ is approximately 15°, other variations of the angle θ will be apparent to those skilled in the art. Similarly, the inclination of the angle β of the engaging surfaces 30, 46, 30' and 46' of the hook members 16, 32, 16' and 32' and the inclination of the angle β of the interior end surfaces 24, 44, 24' and 44' can be varied from being approximately 15°.

In yet another embodiment, the invention provides a method of locking together two mating cell halves 12 and 14 comprising the step of providing clips 11 at the end of each cell half, where the clips 11 are comprised of male members 16 and female members 22 which engage each other so that upon engagement, a force is exerted inwardly towards each of the mated cell halves 12 and 14, and along a line that is oblique to the central axis 29 of the cell halves 12 and 14.

It is to be understood that both the foregoing general description and the following detailed description are exemplary and explanatory and are intended to provide further explanation of the invention as claimed.

What is claimed:

1. A lens cell half for use in a projection television lens assembly, comprising:

a pair of hook members projecting from a first edge of said lens cell half, said hook members being spaced apart a distance from each other on said first edge, each of said hook members further comprising a rigid portion that is integral with and tangent to said lens cell half, an end of said rigid portion of said hook member being integrally connected to an inverted flexible portion oriented at an angle θ with respect to a plane parallel to said rigid portion;

a pair of loop members adapted for receiving a pair of mating hook members, each of said loop members being integral with and projecting from said lens cell half, each of said loop members being proximate to a second edge of said lens cell half, said loop members being spaced apart from each other on said lens cell half, each of said loop members having a tab member integral with and extending from an interior surface of each of said loop members, said interior surface being distal to said lens cell half, said tab member having an exterior end protruding out of said loop member and an opposite interior end surface residing within said loop member; wherein said inverted flexible portion of each of said hook members terminates in an engaging surface inclined at an angle β with respect to a plane that is substantially at a right angle to said rigid portion, and wherein said interior end surface of each of said tab members residing within said loop members is inclined at about the same angle β with respect to a plane that is substantially at a right angle to said tab member.

2. The lens cell half of claim 1, wherein said angle θ is equal to said angle β.

3. The lens cell half of claim 1, wherein an interior surface of said tab member between said exterior end and said interior end surface is inclined at about the same angle θ with respect to a plane that is at a right angle to a central axis of said lens cell half.

4. A plastic locking clip comprised of: an injection molded unitary male member and an injection molded unitary female member; said female member comprising a first wall, two spaced apart, generally parallel walls extending outwardly from said first wall, the proximal ends of said parallel walls being integrally connected to said first wall, a fourth wall extending from and integrally connecting the distal ends of said parallel walls thereby defining a space between said fourth wall and said first wall and an insertion end into which a male member may be inserted, an interior surface of said fourth wall, at said insertion end, being inwardly inclined at an angle θ with respect to a plane extending centrally through said space and equally spaced from said first and fourth walls, said interior surface terminating at a point P where said interior surface is intersected by a second surface that extends outwardly from and is integral with said fourth wall, said second surface terminating at the interior of said fourth wall, said point P being spaced from a point S1 on the interior of said first wall by a distance X1, each of said points P and S1 being in a plane that is at a right angle to each of said first and fourth walls; and said male member comprising a first wall, a second wall integral with and extending at substantially a right angle from said first wall, a third wall integrally connected to said second wall and extending therefrom so as to define a space between said first wall and said third wall, the interior and exterior surface of said third wall being at an angle θ with respect to the interior surface of said first wall, said third wall terminating at a surface thereof which is inclined substantially at an angle β with respect to a plane which is at a right angle to the interior of said first wall, the intersection of said inclined surface and the exterior surface of said third wall defining a point Y, said point Y being spaced apart from a point S2 on the exterior of said first wall by a distance X2, each of said points Y and S2 being in the same plane that is at a right angle to each of said first and third walls of said male member, said distance X2 being greater than said distance X1, the exterior of said first wall having a step formed therein for engagement with a terminal end of said first wall of said female member parallel.

5. The plastic locking clip of claim 4, wherein said angle θ is equal to said angle β.

6. A locking device for a lens cell used in a projection television lens assembly, said locking device comprising:

a first lens cell half;

a second lens cell half:

a first hook member projecting from a first edge of said first lens cell half, said first hook member having a rigid portion that is integral with and tangent to said first lens cell half, an end of said rigid portion of said first hook member being integrally connected to an inverted flexible portion oriented at an angle θ with respect to a plane parallel to said rigid portion;

a first loop member adapted for receiving a mating hook member, said first loop member being integral with and projecting from said second lens cell half, said first loop member being proximate to a second edge of said second lens cell half, said first loop member having a first tab member integral with and extending from an interior surface of said first loop member, said interior surface of said first loop member being distal to said second lens cell half, said first tab member having an exterior end protruding out of said first loop member and an opposite interior end surface residing within said first loop member, said exterior end of said first tab member being positioned at an insertion end of said first loop member;

a second hook member projecting from a first edge of said second lens cell half, said second hook member having a rigid portion that is integral with and tangent to said second lens cell half, an end of said rigid portion of said second hook member being integrally connected to an inverted flexible portion oriented at substantially the same angle θ with respect to a plane parallel to said rigid portion;

a second loop member adapted for receiving a mating hook member, said second loop member being integral with and projecting from said first lens cell half, said second loop member being proximate to a second edge of said first lens cell half, said second loop member having a second tab member integral with and extending from an interior surface of said second loop member, said interior surface of said second loop member being distal to said first lens cell half, said second tab member having an exterior end protruding out of said second loop member and an opposite interior end surface residing within said second loop member, said exterior end of said second tab member being positioned at an insertion end of said second loop member;

wherein said first hook member is inserted into said first loop member at said insertion end of said first loop member and wherein said second hook member is inserted into said second loop member at said insertion end of said second loop member, and wherein an engaging surface of said inverted flexible portion of each of said first hook member and said second hook member firmly abuts said interior end surface of each of said first tab member and said second tab member of said first loop member and second loop member, respectively.

7. The locking device of claim 6, further comprising:

a third hook member projecting from said first edge of said first lens cell half, said third hook member having a rigid portion that is integral with and tangent to said first lens cell half, an end of said rigid portion of said third hook member being integrally connected to an inverted flexible portion oriented at substantially the same angle θ with respect to a plane parallel to said rigid portion;

a third loop member adapted for receiving a mating hook member, said third loop member being integral with and projecting from said second edge of said second lens cell half, said third loop member having a third tab member integral with and extending from an interior surface of said third loop member, said interior surface of said third loop member being distal to said second lens cell half, said third tab member having an exterior end protruding out of said third loop member and an opposite interior end surface residing within said third loop member, said exterior end of said third tab member being positioned at an insertion end of said third loop member;

a fourth hook member projecting from said first edge of said second lens cell half, said fourth hook member having a rigid portion that is integral with and tangent to said second lens cell half, an end of said rigid portion of said fourth hook member being integrally connected to an inverted flexible portion oriented at substantially the same angle θ with respect to a plane parallel to said rigid portion;

a fourth loop member adapted for receiving a mating hook member, said fourth loop member being integral with and projecting from said second edge of said first lens cell half, said fourth loop member having a fourth tab member integral with and extending from an interior surface of said fourth loop member, said interior surface of said fourth loop member being distal to said first lens cell half, said fourth tab member having an exterior end protruding out of said fourth loop member and an opposite interior end surface residing within said fourth loop member, said exterior end of said fourth tab member being positioned at an insertion end of said fourth loop member; wherein said third hook member is inserted into said third loop member at said insertion end of said third loop member and wherein said fourth hook member is inserted into said fourth loop member at said insertion end of said fourth loop member, and wherein an engaging surface of said inverted flexible portion of each of said third hook member and said fourth hook member firmly abuts said interior end surface of each of said third tab member and said fourth tab member of said third loop member and fourth loop member, respectively.

8. The locking device of claim 6, wherein said first edge of said first lens cell half abuts said second edge of said second lens cell half and wherein said second edge of said first lens cell half abuts said first edge of said second lens cell half.

9. The locking device of claim 7, wherein said first hook member is positioned approximately 180° apart from said second loop member on said first lens cell half, and wherein said third hook member is positioned approximately 180° apart from said fourth loop member on said first lens cell half.

10. The locking device of claim 7, wherein said second hook member is positioned approximately 180° apart from said first loop member on said second lens cell half, and wherein said fourth hook member is positioned approximately 180° apart from said third loop member on said second lens cell half.

11. The locking device of claim 7, wherein said engaging surface of said inverted flexible portion of each of said hook members is inclined at an angle β with respect to a plane that is at a right angle to said rigid portion of said hook members, and wherein said interior end surface of each of said tab members residing within said loop members is inclined at substantially the same said angle β with respect to a plane that is at a right angle to said interior surface of said tab member.

12. The locking device of claim 7, wherein an interior surface of each of said tab members from said exterior end to said interior end surface is inclined at the same said angle θ with respect to a plane that is at a right angle to said central axis of said lens cell.

13. The locking device of claim 7, wherein said angle θ is equal to said angle β.

14. The locking device of claim 7, wherein said angle θ is approximately 15°.

15. The locking device of claim 7, wherein said lens cell is made of plastic.

16. The locking device of claim 13, wherein said angle β is approximately 15°.

17. The locking device of claim 16, wherein during insertion of each of said hook members within each of said loop members, respectively, a deflection force $F_d$ is exerted against said flexible portion of each of said hook members to deflect each of said hook members from within each of said loop members, said deflection force $F_d$ being directly proportional to said angle θ.

18. The locking device of claim 16, wherein upon engagement of each of said hook members within each of said loop members, respectively, a retention force $F_r$ is exerted against each of said hook members to retain engagement of each of said hook members within each of said loop members, respectively.

19. The locking device of claim 18, wherein said deflection force $F_d$ is equal in magnitude and opposite in direction to said retention force $F_r$.

20. The locking device of claim 19, wherein said retention force $F_r$ is given by the formula $F_r = F_i \cos(90-\theta)$, wherein $F_i$ is the insertion force exerted against each of said hook members during insertion.

21. A lens cell for use in a projection television lens assembly, said lens cell comprising a pair of matching lens cell halves, one of said pair of matching lens cell halves being fixedly connected to the other of said pair of matching lens cell halves by a plurality of interlocking members, each of said interlocking members, further comprising:
   a hook member; and
   a corresponding loop member adapted for receiving a mating hook member, said hook member being attached to a first edge of one of said pair of matching lens cell halves and said corresponding loop member being attached to a second edge of the other of said pair of matching lens cell halves, each of said hook members, further comprising an integral rigid portion extending from and being tangent to said pair of matching lens cell halves, an end of said rigid portion being integrally connected to an inverted flexible portion oriented at an angle $\theta$ with respect to a plane parallel to said rigid portion, each of said loop members further comprising an integral tab member extending from an interior surface of said loop members, said interior surface being distal to said pair of matching lens cell halves, each of said tab members having an exterior end protruding out of each of said loop members and an opposite interior end surface residing within each of said loop members, said exterior end of each of said tab members being positioned at an insertion end of said loop members; wherein each of said hook members is inserted at said insertion end, into each of said loop members, and wherein an engaging surface of said inverted flexible portion of each of said hook members firmly abuts said interior end surface of each of said tab members of said loop members, respectively.

22. The lens cell of claim 21, wherein one of said pair of matching lens cell halves is fixedly connected to the other of said pair of matching lens cell halves by four interlocking members, wherein two of said four interlocking members are positioned approximately 180° apart from each other, and wherein the other two of said four interlocking members are positioned approximately 180° apart from each other, wherein said first two interlocking members are spaced apart a distance from said other two interlocking members on said lens cell.

23. The lens cell of claim 21, wherein said lens cell is made of plastic.

24. The lens cell of claim 21, wherein said engaging surface of said inverted flexible portion of each of said hook members is inclined at an angle $\beta$, and wherein said interior end surface of each of said tab members is inclined at substantially the same said angle $\beta$ with respect to a plane that is at a right angle to said rigid portion of each of said hook members.

25. The lens cell of claim 21, wherein said angle $\theta$ is equal to said angle $\beta$.

26. The lens cell of claim 21, wherein said angle $\theta$ is approximately 15°.

27. The lens cell of claim 24, wherein said angle $\beta$ is approximately 15°.

28. The lens cell of claim 24, wherein upon engagement of each of said hook members within each of said loop members, a retention force $F_r$ given by the formula $F_r = F_i \cos(90-\theta)$ is exerted to maintain engagement of each of said hook members within each of said loop members, wherein $F_i$ is the insertion force exerted each of said hook members during insertion.

* * * * *